(12) United States Patent
Bandeian, III et al.

(10) Patent No.: US 6,514,020 B2
(45) Date of Patent: Feb. 4, 2003

(54) PILOT BIT GUIDE DEVICE

(76) Inventors: John J. Bandeian, III, 3169 W. State St., Bristol, TN (US) 37620; John J. Bandeian, Jr., 3169 W. State St., Bristol, TN (US) 37620

( * ) Notice: Subject to any disclaimer, the term of this patent is extended or adjusted under 35 U.S.C. 154(b) by 0 days.

(21) Appl. No.: 09/751,617

(22) Filed: Dec. 28, 2000

(65) Prior Publication Data

US 2002/0085890 A1 Jul. 4, 2002

(51) Int. Cl.⁷ .............................. B23B 49/02
(52) U.S. Cl. ................ 408/72 B; 408/97; 408/80; 408/115 B; 408/112
(58) Field of Search .............. 408/72 R, 72 B, 408/80–82, 97, 112, 115 R, 115 B

(56) References Cited

U.S. PATENT DOCUMENTS

| | | | | |
|---|---|---|---|---|
| 3,049,031 A | * | 8/1962 | Carstens | 408/115 R |
| 4,544,307 A | * | 10/1985 | Miller | 408/72 B |
| 5,388,933 A | * | 2/1995 | Dunbar | 408/72 B |
| 5,746,551 A | * | 5/1998 | Skaggs | 408/80 |

FOREIGN PATENT DOCUMENTS

GB          564137 A    *  9/1944

\* cited by examiner

*Primary Examiner*—Steven C. Bishop

(57) ABSTRACT

A guide device for pilot hole drill bits for use with hardware items having countersunk screw holes, wherein the device provides a drill bit holder which is reciprocably mounted in a body member on a drill axis and which is formed with an abutment end portion, wherein axial position adjustment structure is provided for allowing the end portion to contact the angled wall surfaces of a countersunk screw hole on a plane which is oriented normal to the axis of a screw hole and the drill axis, wherein the body member lies flat on the upper surface of the item.

4 Claims, 1 Drawing Sheet

PILOT BIT GUIDE DEVICE

BACKGROUND OF THE INVENTION

1. Field

This invention concerns drill bit guide devices or jigs and particularly those jigs which are to be employed for properly aligning a drill bit with the screw hole in a hardware item, such as is common in door hinges, latches and the like which have countersunk holes for flat head mounting screws. For such items, if the pilot hole for the screw is not drilled exactly in the center, i.e., axially of the countersunk hole, and if the pilot hole is not drilled exactly perpendicular, i.e., normally to the hardware item, the head of the screw will not be flush with the outer surface of the item when the screw is driven home. The purpose and utility of the present device is to permit one to drill a flat head screw pilot hole that is exactly centered in the countersunk screw hole and exactly perpendicular to the work surface. Also, the present device has universal utility for practically any size countersunk screw hole regardless of the angle and depth of the countersunk walls.

The usefulness of such guides or jigs is well described in the "Technical Field" description of U.S. Pat. No. 4,544,307, to wit:

"When flathead screws are used to attach workpieces to backings, extreme accuracy is necessary in the location and entry angle of the pilot holes, so that a jig would be indicated. For, as the heads of such screws are driven home into their countersunk orifice, the position assumed by the workpieces is irrevocably committed, with no compensating possible. When the workpiece is a hinge, an almost imperceptible error in hinge position could be multiplied by the moment arm of the door closure to result in a functional error at the latch side of the door."

2. Prior Art

The most relevant prior U.S. patent in this field known to Applicant is U.S. Pat. No. 4,544,307. The jig of this patent however, does not have universal application to countersunk holes and is stated as being specific to a particular workpiece. It is also characterized as having no moving parts. Such construction, as will be seen, is markedly different from Applicant's device.

Objects, therefore, of the present invention are: to provide a pilot hole drilling guide device which can be used for practically any size and contour of countersunk screw holes; and to provide such a device with structure for automatically axially centering a drill bit with a countersunk screw hole in a hardware item.

SUMMARY OF THE INVENTION

The above and further objects hereinafter appearing have been attained in accordance with the present invention which, in a broad embodiment, is defined as a guide device for pilot hole drill bits for use with hardware items having countersunk screw holes, wherein the device provides a drill bit holder which is reciprocably mounted in a body member on a drill axis and which is formed with an abutment end portion, wherein axial position adjustment structure is provided for allowing said end portion to contact the angled wall surfaces of a countersunk screw hole on a plane which is oriented normal to the axis of a screw hole and the drill axis, wherein the body member lies flat on the upper surface of the item.

BRIEF DESCRIPTION OF THE DRAWINGS

The invention will be further understood from the following description and drawings wherein the figures are not drawn to scale and certain structures are enlarged for clarity, wherein.

DETAILED DESCRIPTION

Figure 2:
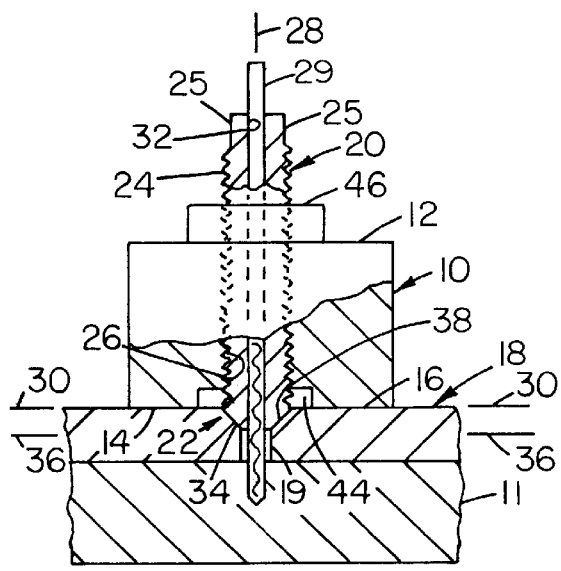
FIG. 2 is a cross-sectional view of the embodiment of the guide device of FIG. 1 taken along line 2—2 of FIG. 1.

Referring to the drawings and with particular reference to the claims hereof, the present guide device for drilling a pilot hole into a substrate 11 comprises body means 10 having an upper surface means 12 and flat bottom surface means 14 lying in a plane 30 and adapted to sit flat on an outer or countersunk surface 16 of a hardware item 18 having one or more countersunk screw holes generally designated 19. A pilot drill bit holder 20 having an abutment end portion 22 and an adjustment end portion 24 is reciprocably threadedly mounted in bore means 26 which extends thru body means 10 from upper surface 12 to bottom surface means 14 on a reciprocation axis 28 oriented normal to plane 30 of bottom surface means 14. A drill bit lead aperture 32 is formed thru holder 20 on axis 28 for receiving a pilot hole drill bit 29. The abutment end portion 22 has a rim-like shoulder means 34 adapted to lie in a contact plane 36 oriented normal to axis 28 and is adapted to abut angled surface portions 38 of the countersunk hole 19 on plane 36 whereby the axis of the drill bit lead aperture and drill bit will lie normal to plane 36.

It is noted that plane 36 is a "floating" plane in the sense that its precise location along axis 28 is determined by bringing a rim-like shoulder means or rim line 34 into contact with surface portions 38 with screw hole 19 and aperture 32 being in axial alignment. The term "rim line" includes a line contact of the end portion 22 such as shown in FIGS. 3, 4, 6 and 8 as well as a full contact of 22 as shown in FIGS. 2 and 5. Also, the flat bottom surface means 14 of body 10 may comprise a single, unbroken surface, or may comprise spaced surface portions or ridges provided that the portions or ridges lie in the same plane such that when they contact surface 16, axis 28 will be perpendicular to surface 16.

Figure 3:
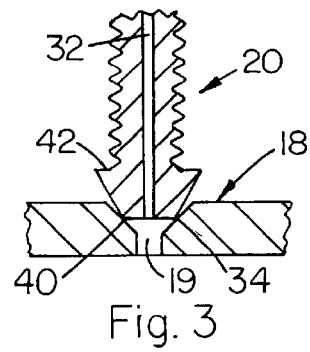
FIG. 3 is a cross-sectional view of a variation of the abutment end portion of the bit holder in use on a shallow angled countersunk screw hole.
Figure 4:
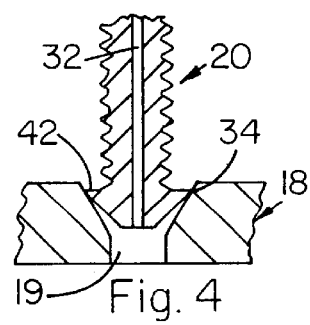
FIG. 4 is an enlarged cross-sectional view as in FIG. 3 showing use of the device shown in FIG. 3 in a sharply angled countersunk screw hole.
Figure 5:
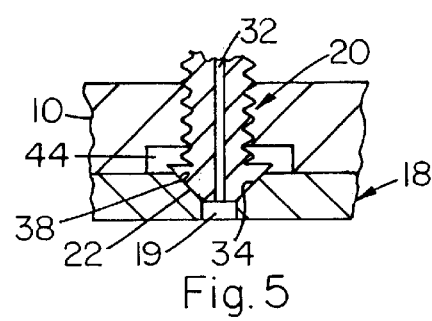
FIG. 5 is a cross-sectional view as in FIG. 3 showing use of the device shown in FIG. 3 in a countersunk screw hole angled the same as the abutment end portion of the drill bit holder.

The end portion 22 of holder 20 may be formed as a nose section 21 of slightly larger diameter than the rest of 20 as shown in FIGS. 3, 4 and 5 such that a well defined rim such as 40 or 42 of shoulder means 34 will contact or abut the angled sides or surface portions 38 such of the countersunk hole even if a perfect angle match of 22 and 38 as shown in FIG. 5 is not made. A circular recess 44 may be provided in body 10 to allow any desired clearance between the abutment end portion 22, body 10, and item 18 for ensuring proper seating of 22 in the countersunk hole 19.

In the operation of the embodiments of FIGS. 1 thru 6, preferably without bit 29 inserted into 32, and with holder 20 screwed axially upwardly a sufficient distance in body 10 so as not to allow the abutment end portion 22 to bottom out into screw hole 19, body 10 is placed flat onto upper surface 16 of item 18 with holder 20 approximately, i.e., eyeballed, axially aligned with screw 19 hole. Holder 20 is then screwed downwardly into the hole as the holder is slid back and forth or in a orbital manner in small increments across surface 16 until the operator feels that the holder is bottomed out in the screw hole and that body 10 is lying flat and firmly on surface 16. At this point, the operator can hold body 10 down against surface 16 in the aligned position and the drill bit held in a power drill then inserted into aperture 32 and operated to drill a pilot hole into substrate 11 to a desired depth.

Figure 1:
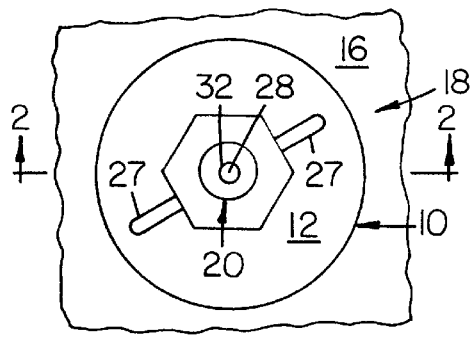
FIG. 1 is a top view of one embodiment of the present guide device.
Figure 6:
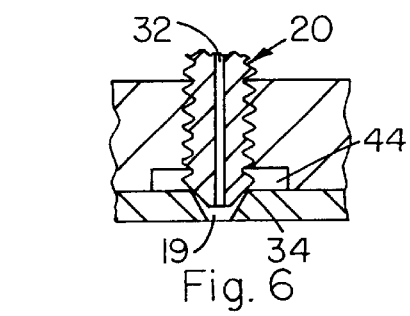
FIG. 6 is a view as in FIG. 2 showing use of the device shown in FIG. 2 with a sharply angled countersunk screw hole.

A lock nut such as 46 may be threaded onto holder 20 and tightened against upper surface 12 of body 10 to fix the axial position of holder 20 in body 10. Such is particularly useful where a number of pilot holes are to be drilled for the same item whereby holder 20 might otherwise become inadvertently axially moved in the process. A leverage means may be provided on the adjustment end 24 of holder 20 to facilitate axially moving the holder in bore means 26. Such leverage means may comprise wrench flats 25 on end 24 as shown in FIG. 2, or hand operated torque arms 27 or the like fixed to 24 as shown in FIG. 1.

Figure 8:
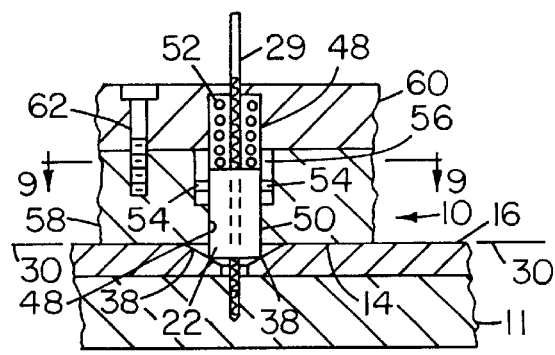
FIG. 8 is a cross-sectional view of the device of FIG. 7 taken along line 8—8 in FIG. 7.
Figure 9:
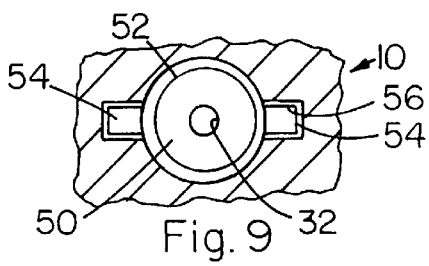
FIG. 9 is an enlarged cross-sectional view taken along line 9—9 of FIG. 8.
Figure 7:
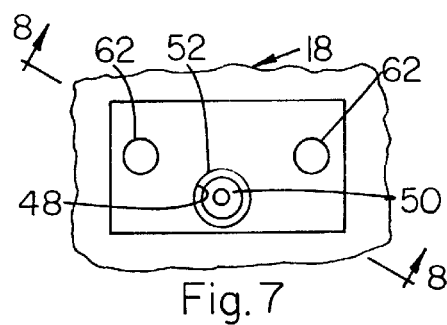
FIG. 7 is a top view of a structural variation of the present guide device.

Referring to the embodiment of FIGS. 7–9, the body means 10 is provided with a bore 48 in which a piston or bit holder 50 is axially reciprocably mounted. A compression spring 52 in bore 48 continually urges piston 50 with, e.g., a one or two pound force, axially toward the hardware item. By means of this spring force and the counteracting force provided by the operator in sliding body 10 toward an axial alignment with the screw hole, a perfect axial alignment is automatically and essentially assured. It is noted that the non-conical shape of the abutment end portion 22 of this embodiment further assures that a firm and accurate contact of 22 with the countersunk wall surfaces 38 of practically any size and angled screw hole will occur.

Stop or shoulder means such as pins 54 fixed to the piston slide axially within slots 56 formed in body 10 and prevent axial movement of the piston in body 10 beyond that which would be required to bottom out the piston in the screw holes of any but the most unusual of hardware items.

In this embodiment, the body 10 can be made in two sections such as 58 and 60 such that the piston and spring can be placed within bore 48 and the two body sections then fastened together by machine screws 62 or the like. Also, body 10 can be of any size and configuration as long as it has the equivalent of the structure described and claimed herein, and may be provided with multiple bit holders such that multiple pilot holes can be drilled by a single placement of the body on an item.

The invention has been described in detail with particular reference to preferred embodiments thereof, but it will be understood that variations and modifications will be effected with the spirit and scope of the invention.

We claim:

1. A guide device for accurately centering a drill bit thru a screw hole which is countersunk in a flat outer surface of a hardware item, which item is to be affixed by one or more screws to a substrate, said device comprising body means having an upper surface and flat bottom surface portions, said bottom surface portions lying in a pressure plane and adapted to sit flat on said outer surface of said item, an elongated, externally threaded pilot drill bit holder having a centering end portion and an adjustment end portion and being threadedly mounted in bore means thru said body means on an axis of said bore means, which axis is oriented normal to said pressure plane, said adjustment end portion extending axially outwardly of said upper surface, a drill bit lead aperture extending thru said holder on said axis, said centering end portion having circular rim-like shoulder means lying in a locator plane oriented normal to said axis, said holder being threadedly adjustable along said axis to position said centering end portion at a proper distance below said pressure plane for contacting angled surface portions of said countersunk hole simultaneously with said bottom surface portions coming into pressure contact with said outer surface of said item whereby the axis of said lead aperture will lie normal to said pressure plane, and cooperating elements of locking means on said adjustment end portion and said body means and adapted to lock said holder in a desired adjusted axial position in said body means.

2. The guide device of claim 1 wherein said locking means comprises a locking nut threaded onto said adjustment end portion and adapted to be tightened into contact with said upper surface of said body means for fixing and locking said holder in a desired adjusted axial position in said body means.

3. The device of claim 1 wherein said shoulder means comprises a peripheral rim line of a cone shaped centering end portion.

4. The device of claim 1 wherein said shoulder means constitutes a peripheral rim line comprising the centering end portion of a cylinder shaped, threaded drill bit holder.

* * * * *